United States Patent [19]

Doniat

[11] 4,356,242

[45] Oct. 26, 1982

[54] ELECTRODE CONSTRUCTION FOR LIQUID ELECTROLYTE ELECTROCHEMICAL GENERATORS

[76] Inventor: Denis Doniat, 14 rue des Marronniers, 75016 Paris, France

[21] Appl. No.: 338,322

[22] Filed: Jan. 11, 1982

Related U.S. Application Data

[63] Continuation of Ser. No. 164,839, Jun. 30, 1980.

[30] Foreign Application Priority Data

Jul. 6, 1979 [FR] France ................... 79 17540

[51] Int. Cl.³ .......................................... H01M 4/72
[52] U.S. Cl. ................................. 429/234; 429/222; 429/223
[58] Field of Search .............. 429/234–237, 429/245, 233, 222, 223

[56] References Cited

U.S. PATENT DOCUMENTS

| | | | |
|---|---|---|---|
| 2,834,825 | 5/1958 | Wenzelberger | 429/234 |
| 3,266,936 | 8/1966 | Kiebs | 429/235 |
| 3,556,855 | 1/1971 | Howells | 429/234 |
| 3,560,262 | 2/1971 | Baba et al. | 429/234 X |
| 3,657,014 | 4/1972 | Faber | 429/234 |
| 4,121,023 | 10/1978 | Parkinson | 429/234 X |
| 4,129,692 | 12/1978 | King et al. | 429/234 |
| 4,215,190 | 7/1980 | Ferrando | 429/235 X |

*Primary Examiner*—Charles F. Lefevour
*Attorney, Agent, or Firm*—Bucknam and Archer

[57] ABSTRACT

The electrode is formed from a permeable thin substrate constituted by an inorganic or organic substance whose porous or fibrous texture is such that the ratio between the effective surface and the boundary surface is large. This substrate is metallized over the entire effective surface, throughout its thickness, in order to constitute a charge collector. On this is then formed, over the entire effective surface, that is to say, throughout the thickness of the substrate, a thin deposit of active electrode material so that neither the porosity of the substrate nor the effective surface are substantially reduced.

24 Claims, No Drawings

ELECTRODE CONSTRUCTION FOR LIQUID ELECTROLYTE ELECTROCHEMICAL GENERATORS

This is a continuation of application Ser. No. 164,839, filed June 30, 1980.

BACKGROUND AND GENERAL DESCRIPTION OF THE INVENTION

The present invention relates to electrochemical generators. It constitutes a novel electrode design and construction intended for use in accumulators with a liquid electrolytic medium.

Considerable research is directed at present to providing accumulators characterised by high energy per unit weight and by high power per unit weight. Two principal courses are being followed: that of electrochemical couples incompatible with an aqueous electrolyte; and that of more conventional couples whose operating temperature is close to ambient temperature.

For the first route, even systems which appear the most promising (Na-S and SFe-Li, for example) only seem to be able to provide, despite a very high theoretical energy per unit mass, a practical energy per unit mass of the order of 100 Wh/kg. In addition, they are penalised as much by their cost per KWh as by the high temperature at which they operate, which limits considerably their possible types of use.

As regards accumulators operating at a temperature close to ambient temperature and compatible with an aqueous electrolytic medium, it is possible to employ, besides the Pb-PbO$_2$ couple, certain systems which operate in an alkaline medium with, as anodes, iron, hydride or zinc electrodes. Cathodes which can be contemplated may be, as the case may be, oxygen electrodes, or notably nickel hydroxide electrodes.

Regarding iron or hydride anodes and so-called reversible oxygen electrodes, fundamental problems have also to be solved before it is possible to contemplate the perfecting of generators applying these elements. As regards the zinc anode, which is a priori very interesting both for its potential and for its theoretical capacity, it only appears to be usable at present in a dispersed from if it is desired to be able to achieve a sufficient number of discharge cycles . . . .

It is an object of the present invention to provide a novel solution in research for accumulators capable of providing high energy per unit mass and power per unit mass. It makes possible the production of such generators by innovations at the level of the structure itself of the electrodes, for conventional electrode couples. Thus, this novel electrode construction design can be applied notably in the case of nickel-cadmium generators. It can also be applied to iron electrodes and will be of a nature to render conceivable the use of iron-nickel generators as soon as decisive progress has been enregistered as regards the characteristics of the iron electrode. In general, the present invention is capable of finding applications for the realisation of electrodes used in liquid electrolyte electrochemical generators.

The invention consists of a novel electrode construction design. According to this invention, this electrode is formed of a porous structure of slight thickness, by the deposition of a metallic layer designed to ensure the collection of the current, and then a layer of the active material of the electrode.

An electrode so constructed is designed to offer a certain number of advantages whose research provides the choice of elements entering into its development.

The object to be achieved being to obtain considerable energy and capacity per unit mass, the substrate selected is a structure of slight density of an inorganic or organic material with a porous or fibrous structure. Its weight must be slight with respect to that of the electrode material. Its actual surface area or effective surface area of the substrate, throughout its thickness, must be high with respect to the boundary surface area. The substrate can be constituted by any light material and chemically inert under the conditions of use: it can notably, and as the case may be, be of carbon, graphite, celluloses, polyesters, polyamides, . . . In the case of the use of a porous substrate, it is possible, for example, to resort to microporous films, notably of polyvinyl chloride. The dimension of the pores is then selected so as to obtain an effective surface which is as large as possible, which leads to the use of a very small pore size, without however exaggerating this character which would risk a plugging of the cavities and hence a reduction of the actual surface area and overall porosity on the deposition of the charge collector and of the active electrode material. For these reasons, the choice bears preferably on a material whose pores have a diameter comprised between 3 and 30 microns. In order also that the ratio of the effective surface area to the boundary surface area may be as high as possible, the value of the porosity should be high, that is it should not be less than 50%. Finally, the thickness of the microporous element should be limited to a value which does not exceed preferably 500 microns. The reason therefor is that the deposits which are formed by the development of the electrode, must be formed over the entire effective surface of the microporous substrate, that is to say throughout the thickness of this support, within each of the pores of the latter. Consequently, it is not possible to give the substrate a very considerable thickness which would prevent the production of these deposits throughout its volume. In the case of the use, as a substrate, of a permeable felt or fabric, the diameter of the fibers, the compactness of their entanglement and the thickness of the material should be determined according to the same criteria.

In any event, the thickness to be given to the substrate is determined, whether it is a porous or fibrous structure and in this second case, woven or non-woven, is determined according to its porosity and the dimension of its internal pores or interstices, the thickness being increasable if a highly "aerated" structure is chosen, so that the deposits to be formed on the substrate may be produced throughout the thickness of the initial support and without plugging of the latter.

On the porous substrate thus selected, a metallic layer designed to ensure the conduction of the electrical charges is formed in a first stage: it amounts to constituting a current collector. The latter is obtained by the formation over the entire effective surface area of the substrate, that is to say throughout its thickness, of one or several metal deposits.

All of these deposits are formed so as not to cause plugging of the structure, that is to say, so that it is as uniform as possible and its thickness is of the order of a micron or several microns. The latter is, moreover, determined so that, taking into account the dimension of the electrodes and of the collection method (frontal or marginal), the ohmic drops in this collector are negligible.

The constitution of the collector on the initial substrate is selected to respond to the following criteria: to be inert in the successive treatment and use media, and, whilst being a good electrical conductor, have an acceptable cost price.

The production of the collector by metallization can then be formed in various ways, varying notably according to the nature of the initial substrate, the nature of the active electrode material and the type of use of the latter.

In general, it appears useful to constitute the collector by the succession of at least two metallic deposits. In fact, except when the initial substrate is conductive in itself (the case notably of graphite or carbon felts or fabrics), it is necessary for the first metallic deposit to be produced by a chemical route. However the thickness of such a type of deposit is mostly insufficient to ensure a sufficient electrical conductibility. It is then advantageous to follow it with a second metallic deposit, carried out by the electrochemical route.

Preferentially, but without being limiting, the material constituting the collector will be either of copper, or of nickel, or of a combination of these two successive deposits.

These two metals are selected, the first for its excellent conductivity and its limited cost, the second for its good mechanical and chemical behaviour, in the majority of electrolytic media for the use of electrodes designed according to the present invention.

By way of non-limiting examples of the invention, and in the cases notably of the construction of cadmium or of nickel oxide or hydroxide electrodes, it is possible to constitute the collector by metallization according to the following embodiments:

a chemical deposit of nickel, for example according to the Kanigen process a chemical deposit of nickel followed by an electrochemical deposit of nickel a chemical deposit of copper followed by an electrochemical nickel deposit a chemical nickel deposit, followed by an electrochemical copper deposit, itself covered with an electrochemical nickel deposit a chemical copper deposit followed by an electrochemical copper deposit, itself covered by an electrochemical nickel deposit.

These five routes are notably capable of serving for the constitution of collectors both for a nickel oxide or hydroxide electrode and for a cadmium electrode. They are particularly suitable in the first case, to the extent that it is preferable for the last metallic deposit to be inert in the operating electrolytic medium of the electrode, the deposit of active material (nickel oxide or hydroxide) being porous. The two following routes are notably suitable more particularly for the production of collectors for cadmium electrodes:

chemical nickel deposit followed by an electrochemical copper deposit chemical copper deposit followed by an electrochemical copper deposit.

It has been stated previously that in order to obtain electrodes enabling generators to provide a high energy per unit mass and high power per unit mass, the initial electrode substrates are selected notably for their slight density: their weight must be slight with respect to that of the electrode material.

According to the invention, it is possible to go further along this route, by eliminating the initial substrate: this operation consists, when the structure of the substrate renders this operation conceivable, of oxidising the latter after the necessary metallic deposits have been formed for the production of the current collector. This oxidation must preferably be sudden in order to lead rapidly to the elimination of the initial substrate. The oxidation method which may be employed preferentially is a thermal oxidation which causes calcination of the substrate. In this case, for example, of polyester substrates, notably fibrous, the oxidation may be conducted in an oxidising atmosphere in an oven brought to a temperature of about 300° to 350° C.

When the elimination of the initial substrate is thus carried out, the metallic current collector which has been previously formed, preserves the apparent structure of the substrate but without leaving the skeleton which formed the latter. The essential advantage that is derived from this technique is the disappearance or quasi-disappearance in weight of the initial substrate, which enables the realisation, for example, for nickel or cadmium electrodes, of a gain of about 10 to 15% of specific capacity with respect to nickel or cadmium electrodes formed without elimination of the substrate after formation of the collector. A secondary advantage resides in the fact that the adherence of the active material of the electrode to the collector is increased due to the fact of higher porosity of the collector.

Such a treatment is particularly recommended when the material composing the initial porous substrate, whether it is organic or inorganic, may not have complete physico-chemical stability in the electrolytic medium in which the electrode, once formed, is intended to operate. Thus, for example, the porous substrates based notably on polyesters may be advantageously thermally oxidised when the electrode is required to operate in a basic medium.

In the case where the elimination of the initial substrate is effected, the routes for the constitution of the collector which comprise a first nickel chemical deposit may notably be preferentially used when the electrolytic medium in which the electrode has to operate is of a nature to cause chemical attack of the copper.

Once the metallic deposits intended to constitute the collector are formed, the latter may notably, when it is essentially constituted by electrodeposited nickel from a sulfate base nickel bath, have very high rigidity capable of constituting an inpediment to subsequent handling, whether it relates to deposition of the active electrode material, of the shaping or of the positioning in the inside of an electrolytic cell. The lack of flexibility of the collector may constitute a cause of fragility of the electrode.

To overcome this drawback and according to one of the aspect of the invention, it is possible to carry out on the collector once formed, an annealing operation of the metallic deposits under conditions conventional in themselves. Such an operation has the effect of conferring on the collector a greater flexibility and of reducing consequently and considerably, the risks of rupture of this structure. In the case of a collector constituted essentially of nickel, for example, the annealing operation may be carried out in a neutral or reducing atmosphere in an oven brought to about 850° C. for a period of about one hour.

Once the current collector has been formed by metallization of the thin microporous substrate, deposition of a layer of active electrode material follows throughout its volume over the entire nickeled effective surface. The nature of this deposit depends quite obviously upon the nature of the electrode that it is desired to constitute. In any event, its thickness must be calculated so as not to reduce substantially the porosity of the effective surface.

DESCRIPTION OF PREFERRED EMBODIMENTS

There are appended below, by way of non-limiting Examples the application of the technology according to the present invention, descriptions of preferred embodiments illustrating the features and advantages of the invention in the case of its use for the production of negative and positive electrodes of a nickel-cadmium generator. Naturally, it is perfectly conceivable to use only the technology that is claimed here for the production of one alone of the two types of electrodes of a generator, in the event, in the Example described below, for nickel positive electrodes or for cadmium negative electrodes, the electrodes of the other polarity being conceivable according to any other technique.

It is convenient, before entering into the description of the electrodes of a nickel-cadmium accumulator, according to the invention, to justify the choice which has been made of this Example. In fact, this accumulator is generally known as efficient but particularly expensive, notably on account of the cadmium electrodes. This economic handicap at present limits the uses of the Ni-Cd cell to very narrow fields.

In fact, a careful examination shows that the importance of the cost of this type of generator is not the fact of the cost of the cadmium, but is essentially connected with known techniques of using the components, notably in the case of the use of thin sintered electrodes.

In addition, if it is true that the cadmium electrode is characterised by a negative potential which is not high (just as iron or hydride electrodes), this handicap is largely compensated by the aptitude of this electrode to operate under severe charging and discharging conditions, which property rends the Ni-Cd accumulator particularly apt for power requirements.

Finally, if the capacity per unit mass of nickel and cadmium electrodes is considered, it is observed that, in resorting to the most developed present techniques, it remains, for each of the two electrodes, less than 120 Ah/kg. The theoretical capacities per unit mass are however 294 Ah/kg for the nickel hydroxide and 480 Ah/kg for cadmium. The loss observed at the practical level with respect to the theoretical energy per unit mass is hence very high. This results, certainly in faradic yields very much less than unity, but also in an active mass/collector ratio, by weight, which is particularly unfavorable. It appears that the Ni-Cd cell could be used for the production of accumulators of a cost comparable with that of the Pb-PbO$_2$ cell and of a high capacity per unit mass (higher than 200 Ah per electrode) provided that an electrode technology is adopted which enables the weight of non-active materials with respect to that of the active material in the composition of the electrodes to be made negligible. By the use of a reduced mass of inactive components (substrates, collectors, separators) a better yield of active materials is achieved.

In order to arrive at this objective, nickel and cadmium electrodes have been formed according to the invention. A description by way of non-limiting examples of the invention is given below.

The nickel positive electrode is constituted by using for the microporous substrate, a nylon felt of a thickness about three tenths of a millimeter and of weight 6 mg per cm2 of apparent surface area. The metallization of the entire developed surface is carried out, that is to say, on the surface of the fibers throughout the thickness of the felt by nickel chemical deposits according to the Kanigen process. In order to reinforce this first deposit, it is completed by an electrochemical nickeling according to a conventional technique. Once the two deposits are formed, the current collector weighs about 25 mg/cm2 of apparent surface area. The deposition of the active material of the electrode, the nickel hydroxide then follows, which can be carried out, for example, according to a conventional electrochemical route, the electrolytic reduction of nickel nitrates. In this way, about 70 mg of nickel hydroxide per cm2 of apparent surface area is deposited, which results in a total weight of the electrode of about 95 mg/cm2 of apparent surface area. Its use in charging and discharging cycles at a regime of C/2 causes the appearance of an electrode capacity close to 20 mAh/cm2 of apparent surface area, namely a specific capacity for this electrode, higher than 200 Ah/Kg.

On its side, the cadmium negative electrode is formed from the same microporous substrate on which was effected, as for the positive, the chemical and electrochemical nickeling operations. It should be pointed out that the substrate used for the negative electrode may be chosen as thinner than that which is employed for the production of the positive electrode, to the extent that the capacity per unit mass of cadmium is approximately twice greater than that of nickel hydroxide. The cadmium is then deposited on the entire nickeled effective surface, according to the electrochemical route. This deposit represents a weight of about 45 mg of cadmium per cm2 of apparent surface, which leads to a total weight of the electrode of about 70 mg/cm2. In operation in charging and discharging cycles at a regime of C/2, the capacity of the electrode appears as being here still about 20 mAh/cm2 of apparent surface area, which corresponds to a specific capacity slightly less than 300 Ah/kg.

Taking into account the weight of the electrolyte impregnating the two electrodes constructed according to the invention, of the weight of the separator (thin felt of PVC or of nylon for example) and of that of the impregnating electrolyte, the weight of the whole of the active elements of a Ni-Cd accumulator according to the invention, is about 230 mg/cm2. Its capacity per unit mass is about 90 Ah/kg. The voltage recorded, in the course of cycles at the regime C/2, at the terminals of the generator, is about 1.15 V. The active elements of such a generator hence offer a specific energy per unit mass close to 100 Wh/kg. If account is taken of the fact that the production of a complete accumulator would entail about 20% of the balance by weight defined (weight of the container, of the terminals, ... ), it can be assumed that the complete generator can offer an energy per unit weight of about 80 Wh/kg.

Naturally, according to the present invention, it is possible, after the constitution of the current collectors, to oxidise the microporous substrate thermally, which enables, at the level of each electrode, the realisation of a gain in weight of 6 mg/cm2 and the further improvement of the specific capacities of the electrodes and of the energy per unit weight of a generator utilising them.

It should be stressed, at this stage, that these calculations bear on a system whose characteristics, adapted to the components, may be optimised as a function of the various criteria defined in the description and that is it possible to consider that the values indicated in the example cited are low values.

A Ni-Cd generator constructed according to the invention and such, for example, as described in the illustration which has just been given, is of considerably simpler application that those which rely on conventional technique. Its cost is reduced very considerably, which enables an Ni-Cd generator to be applied to new fields and vast areas of use.

Finally, it is possible to cite briefly as another type of electrode capable of being constructed advantageously according to the invention, the iron electrode. In fact, with a microporous film having 70% of porosity, a thickness of 150 microns, having pores of a diameter of about 10 microns, it is possible to produce an iron electrode offering a capacity of the order of 400 Ah/kg of iron, by carrying out a deposit of 3 to 4 mg of iron per cm2 of boundary surface of substrate.

Naturally, and as emerges already from the foregoing, the invention is not limited to the embodiments or methods of production which have been described, but encompasses all modifications.

I claim:

1. Electrode construction for a liquid electrolyte electrochemical generator, said electrode being formed from a substrate constituted of a non-conducting microporous film, having a porosity at least equal to 50% and a thickness at most equal to about 500 microns, whose pores have a diameter between 3 and 30 microns, all the surfaces of the pores being metallized by at least a first layer, thus forming a charge collector, a thin deposit of active electrode material being deposited on said at least first layer, the total thickness of said at least first layer and of said deposit being such as to avoid clogging of the pores.

2. Electrode construction, according to claim 1, wherein the substrate is a microporous film of polyvinyl chloride.

3. Electrode construction, according to claim 1, wherein the substrate used is a non-woven fibrous structure.

4. Electrode construction, according to claim 3, wherein the substrate is a non-woven fibrous nylon structure.

5. Electrode construction, according to claim 1, wherein the substrate is a woven fibrous structure.

6. Electrode construction, according to claim 5, wherein the substrate is a woven fibrous nylon structure.

7. Electrode construction, according to claim 1, wherein the current collector formed by metallization of the substrate is essentially constituted of nickel.

8. Electrode construction, according to claim 7, wherein the current collector is formed over the entire effective surface of the initial substrate, throughout its thickness, by a single deposit of nickel.

9. Electrode construction, according to claim 7, wherein the current collector is formed over the entire effective surface of the initial substrate throughout its thickness, by a chemically deposited nickel.

10. Electrode construction, according to claim 7, wherein the current collector is formed over the entire effective surface of the initial substrate, throughout its thickness, by electrochemically deposited nickel, the substrate being itself a conductor of electricity.

11. Electrode construction, according to claim 7, wherein the current collector is formed over the entire effective surface of the initial substrate, throughout its thickness, by a chemical deposit of nickel followed by an electro-chemical deposit of nickel.

12. Electrode construction, according to claim 7, wherein the current collector is formed over the entire effective surface of the initial substrate, throughout its thickness, by a chemical deposit of copper followed by an electro-chemical deposit of nickel.

13. Electrode construction, according to claim 1, wherein the current collector formed by metallization of the substrate is essentially constituted of copper.

14. Electrode construction, according to claim 13, wherein the current collector is formed over the entire effective surface of the initial substrate, throughout its thickness, by a single deposit of copper.

15. Electrode construction, according to claim 13, wherein the current collector is formed over the entire effective surface of the initial substrate, throughout its thickness, by chemically deposited copper.

16. Electrode construction, according to claim 13, wherein the current collector is formed over the entire effective surface of the initial substrate, throughout its thickness, by electrochemically deposited copper, when the substrate is by itself a conductor of electricity.

17. Electrode construction, according to claim 13, wherein the current collector is formed over the entire effective surface of the initial substrate, throughout its thickness, by a chemical deposit of copper followed by an electro-chemical deposit of copper.

18. Electrode construction, according to claim 13, wherein the current collector is formed over the entire effective surface of the initial substrate, throughout its thickness, by a chemical deposit of nickel followed by an electro-chemical deposit of copper.

19. Electrode construction, according to claim 1, wherein the current collector is formed over the entire effective surface of the initial substrate, throughout its thickness, by successive deposits of chemical nickel, of electro-chemical copper and finally electro-chemical nickel.

20. Electrode construction, according to claim 1, wherein the current collector is formed over the entire effective surface of the initial substrate, throughout its thickness, by successive deposits of chemical copper, of electro-chemical copper and finally of electro-chemical nickel.

21. Electrode construction, according to claim 1, wherein said current collector includes one or more conductive deposits, formed by metallization of said initial substrate, and wherein said initial substrate is then eliminated from the construction by thermal oxidation.

22. Electrode construction, according to claim 1, wherein the current collector is constituted by one or more metallic deposits, which have undergone an annealing operation.

23. Electrode construction, according to claim 1, comprising an electrode coating based on nickel oxide or hydroxide formed by electro-chemical deposition of this active material on the current collector.

24. Electrode construction, according to claim 1, comprising an electrode coating constituted by an electro-chemical deposit of cadmium, the active material of the electrode, formed on the current collector.

* * * * *

UNITED STATES PATENT AND TRADEMARK OFFICE
CERTIFICATE OF CORRECTION

PATENT NO. : 4,356,242

DATED : October 26, 1982

INVENTOR(S) : Denis Doniat

It is certified that error appears in the above-identified patent and that said Letters Patent is hereby corrected as shown below:

On the title page Insert:

-- (73) Assignee: Sorapec-Societe de Recherche et d'Applications Electrochimiques --.

Signed and Sealed this

Tenth Day of May 1983

[SEAL]

Attest:

GERALD J. MOSSINGHOFF

Attesting Officer

Commissioner of Patents and Trademarks